United States Patent [19]

Apostolos

[11] Patent Number: 4,870,420
[45] Date of Patent: Sep. 26, 1989

[54] SIGNAL ACQUISITION APPARATUS AND METHOD

[75] Inventor: John T. Apostolos, Merrimack, N.H.

[73] Assignee: Sanders Associates, Inc., Nashua, N.H.

[21] Appl. No.: 748,277

[22] Filed: Jun. 24, 1985

[51] Int. Cl.$^4$ .............................................. G01S 5/02
[52] U.S. Cl. .................................. 342/147; 342/196; 342/432; 342/442
[58] Field of Search ................ 343/442; 342/147, 192, 342/127, 133, 107, 132, 139, 140, 146, 192, 196, 417, 423, 432, 437, 442, 443

[56] References Cited

U.S. PATENT DOCUMENTS

| | | | |
|---|---|---|---|
| 2,779,869 | 1/1957 | Gerks | 328/150 |
| 3,212,089 | 10/1965 | Longacre et al. | 343/442 X |
| 3,382,460 | 5/1968 | Blitz et al. | 331/178 |
| 3,406,393 | 10/1968 | Kulik | 342/75 |
| 3,465,247 | 9/1969 | Kubo | 324/77 A |
| 3,560,852 | 2/1971 | Haskin et al. | 324/77 R |
| 3,568,054 | 3/1971 | Ross | 324/77 R |
| 3,670,332 | 6/1972 | Blommendaal | 343/442 X |
| 3,697,997 | 10/1972 | Cooper | 343/442 X |
| 3,728,730 | 4/1973 | Takao et al. | 343/442 |
| 3,743,942 | 7/1973 | Carpenter | 455/148 |
| 3,820,025 | 6/1974 | Lahr et al. | 368/114 |
| 3,880,147 | 4/1975 | Gruenke et al. | 128/702 |
| 3,982,101 | 9/1976 | Kalb et al. | 364/565 |
| 4,150,378 | 4/1979 | Barton | 343/442 X |
| 4,166,980 | 9/1979 | Apostolos et al. | 375/75 |
| 4,170,774 | 10/1979 | Schaefer | 343/442 X |
| 4,244,037 | 1/1981 | Jelks | 367/121 |
| 4,245,333 | 1/1981 | Jelks | 342/373 X |
| 4,305,159 | 12/1981 | Stromswold et al. | 455/226 |
| 4,528,567 | 7/1985 | Miles et al. | 343/442 |
| 4,649,392 | 3/1987 | Apostolos | 342/13 X |

OTHER PUBLICATIONS

Jasik, H., ed., *Antenna Engineering Handbook*, First Edition (McGraw-Hill, New York, 1961), pp. 18-1 through 18-32.
Morgan, M. and Ash, E., "Acoustic-Surface-Wave Dispersive Delay Line", *Proceedings of the IEE*, vol. 116, No. 7, Jul. 1969, pp. 1125-1134.
Rhodes, D., *Introduction to Monopulse*, (McGraw-Hill Book Company; York PA, 1959), pp. 12-15.
Harris, F., "On the Use of Windows for Harmonic Analysis with the Discrete Fourier Transform", *IEEE Proceedings*, vol. 66, No. 1, Jan. 1978, pp. 55-83.

Primary Examiner—Thomas H. Tarcza
Assistant Examiner—John B. Sotomayor
Attorney, Agent, or Firm—Stanton D. Weinstein; David J. Thibodeau, Jr.

[57] ABSTRACT

A novel radio receiver capable of simultaneously and instantaneously determining the frequency and azimuthal and elevational position of many radio signal sources is disclosed. The invention makes use of an antenna array and associated beamforming networks capable of producing an omnidirectional reference signal, and a directional signal in which amplitude depends upon the relative elevational position of the radio frequency source and complex phase depends upon the relative azimuthal position of a radio frequency source.

The use of a two-dimensional compressive receiver in one embodiment provides a way for instantaneously and reliably producing the Fourier transform of these signals, allowing accurate and continuous measurement of phase and amplitude difference. The antenna geometries disclosed additionally provide such signals for a wide input bandwidth.

55 Claims, 6 Drawing Sheets

SIGNAL ACQUISITION APPARATUS AND METHOD

BACKGROUND OF THE INVENTION

The present invention relates to radio direction finding (DF) systems and, more particularly, to a DF-on-the-fly type compressive radio receiver capable of simultaneously and instantaneously determining the frequency and azimuthal and elevational position of multiple radio signal sources.

Direction finding (DF) systems are a well known and popular way to find the relative location of a radio transmitter. Such DF systems are commonly used by vessels at sea, for example, to provide an economic and reliable estimate of position via dead reckoning. That is, by drawing radii at the indicated azimuthal angle from two or more radio sources with known locations, the vessel's current position will be determinable as the point where the radii intersect.

In a situation as shown in FIG. 1, such DF systems can also be used to determine the presence of aircraft or vessels beyond the range of conventional radar. For example, DF systems deployed on a platform 110l, are capable of determining the azimuthal and angle $\phi$ between antenna 112 and any radio signal source 114 in the same horizontal plane. Likwise, the elevation angle $\theta$ between the receive antenna 112 and other radio transmitting platforms 116 and 118 which may be located in a horizontal plane above or below the plane of the receive antenna can also be determined.

In complex military situations, the large number of such remote radio transmitters as indicated at 114, 116 and 118 require nearly instantaneous identification and sorting to maximize the time available to formulate a proper strategic response. These systems are thus commonly described as having a "DF-on-the fly" capability.

U.S. Pat. No. 4,245,333 to Jelks is one such system employing a two-dimensional planar array of receiving elements positioned in rows and columns. Each row of elements is fed to a surface acoustic wave (SAW) device capable of producing a plurality of phase-shifted outputs. In turn, the phase-shifted outputs are fed to a scanning video device capable of indicating the direction and amplitude distribution of a radiating source.

In a so-called Adcock DF-on-the-fly system, a square array of four elements is employed. In such systems, well known in the art, the azimuthal angle can be instantaneously and accurately determined, overcoming the need for the many matching SAW networks inherent in the Jelks approach. Such Adcock antenna arrays are commonly limited to a three-octave bandwidth, however.

Returning again to the scenario of FIG. 1, as radio signal environments grow more dense, it becomes necessary to uniquely identify radio transmitters such as 116 and 120 which lie in approximately the same azimuthal plane, but in different elevational planes, as indicated by the angle $\theta$. Prior radio signal sorting systems have not satisfactorily provided an estimate of elevational angle in an instantaneous and accurate manner. Typically, if such systems provided elevational position information at all, it was by first sorting signals by radio frequency and then employing a plurality of separate radio receivers and beamforming networks in a non-instaneous fashion.

SUMMARY OF THE INVENTION

The present invention overcomes the problems of the prior art by employing a receive antenna array and beamforming networks to provide a pair of signals, one being a reference signal and the other being dependent in a known fashion upon both azimuth and elevation of the transmitter. Additionally, the use of a two dimensional compressive receiver, affords a means for instantaneously and reliably producing the Fourier transform of these signals allowing accurate, continuous meaurement of their phase and amplitude difference without the need for temperature compensation or phase compensation networks. This and other signal processing circuits are also used to extract continous waveforms representing the frequency and azimuthal and elevational position of all radio signals within the bandwidth of the antenna and receiver combination.

It is thus a general object of the present invention to provide measurement of the frequency and relative azimuthal and elevational position of multiple radio signal sources in an instantaneous and simultaneous fashion.

Another object is to output such measurements for a large number of radio signal sources across a wider range of frequencies than is available with current Adcock DF-on-the-fly systems.

Yet another object is to minimize the number of matching acoustic wave devices used to measure the position of the radio signal sources.

A further object is to provide such measurements without the need for costly temperature controlling or compensation apparatus.

Still another object is to provide such measurements without the need for phase tracking and compensation networks normally required when analyzing the relative phase of two signals.

These and even other objects and advantages of the present invention will be apparent to those skilled in the art from the following detailed description and accompanying drawings, in

DESCRIPTION OF VARIOUS EMBODIMENTS

Figure 1:
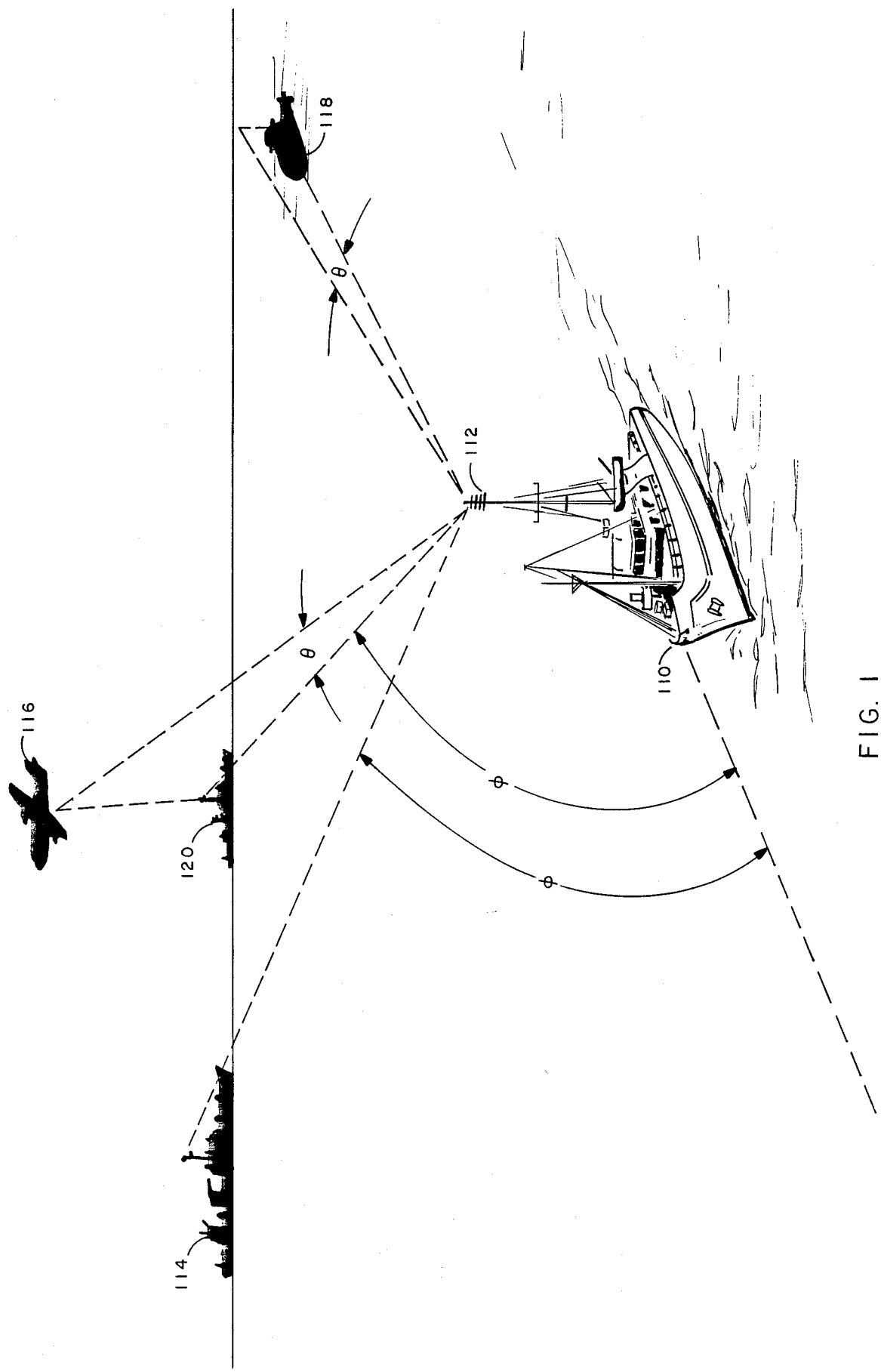
FIG. 1 is a view of the operational environment of the present invention.
Figure 2:
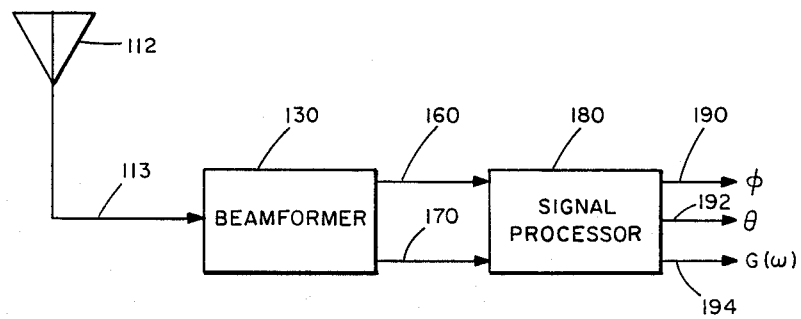
FIG. 2 is a block diagram of the present invention embodied as an antenna, beamformer, and signal processor.

Referring now to the drawings, in which like reference numerals designate like or similar parts throughout the several figures, there is shown in FIG. 2 a block diagram of the present invention. A receiving antenna 112 preferably configured as an array of two or more antenna elements (not shown) provides output signals 113, of which only one is shown for clarity, from each antenna element in electrical form. The element outputs 113 are in turn fed to a beamformer 130. Beamformer 130 combines the element outputs 113 to provide an omnidirectional output signal 160 and a directional output signal 170. Signal 160 is called omnidirectional in that it represents a sum of all radio signals received by antenna 112 and that a particular received signal's relative magnitude and phase will not vary with the azimuthal or elevational position of its source. Signal 170 is called directional in that, while it too represents a sum of all signals received by antenna array 112, a particular received signal's magnitude will depend in a determinable fashion upon the relative elevational position of its source, and a particular received signal's relative phase will be directly proportional to the azimuthal position of the source. Signals 160 and 170 are then input to signal processor 180. Processor 180 periodically compares the phase of signals 160 and 170 thus providing a periodic signal or signals, as generally indicated by 190, proportional to the relative azimuthal angle, $\phi$, of the source of each signal received by antenna 112. Processor 180 also continuously compares the magnitude of signals 160 and 170 thus providing a periodic signal or signals, as generally indicated by 192, proportional to the elevation angle, $\theta$, of the source of each signal received by antenna 112. Processor 180 also outputs a periodic signal or signals 194 indicating the frequency domain amplitude distribution $G(\omega)$, of each signal received by antenna 112.

Figure 3A:
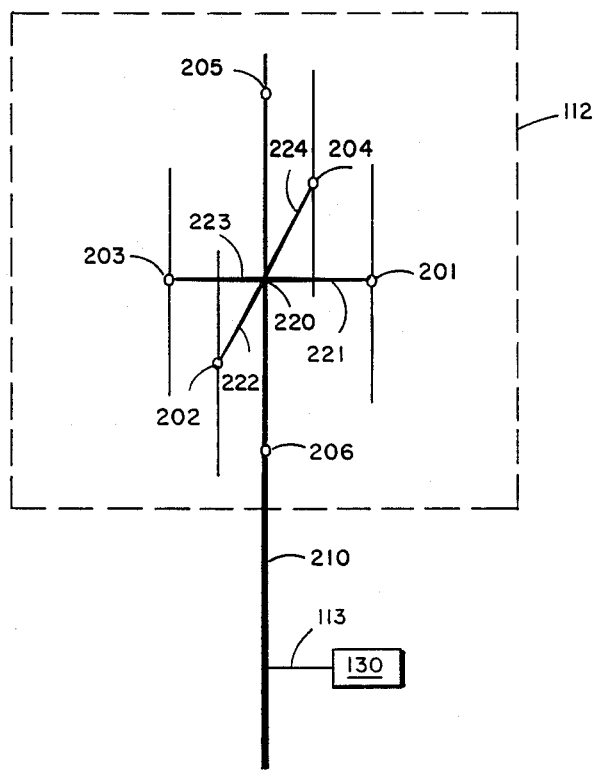
FIG. 3A is an isometric elevational view of an augmented Adcock antenna array used in one of the preferred embodiments.

Turning attention now to FIG. 3A, a specific embodiment of antenna 112 will be disclosed. Presented is a three-dimensional view of an antenna array of the general form known in the art as an Adcock array. Such an array comprises four vertically oriented dipole antenna receiving elements 201, 202, 203, and 204 disposed substantially in the same horizontal plane and equidistant from a central support point 220 so that the lateral supporting members 221, 222, 223, 224 are at substantially right angles to one another. The array shown in FIG. 3A is augmented by two additional antenna receiving elemments, one element 205 disposed substantially above the central support point 220 and the other element 206 disposed substantially below the support point 220. The two additional elements 205 and 206 and the support point 220 are disposed to be substantially coplanar with opposing antenna element pairs 202 and 204 as well as the other opposing pair 201 and 203. The electrical outputs 113 from each of the six antenna elements 201, 202, 203, 204, 205 and 206 are fed through transmission lines (not shown) mounted along lateral supporting members 221, 222, 223, 224 and down the vertical support member 210 to the electronic beamforming device 130.

Figure 3B:
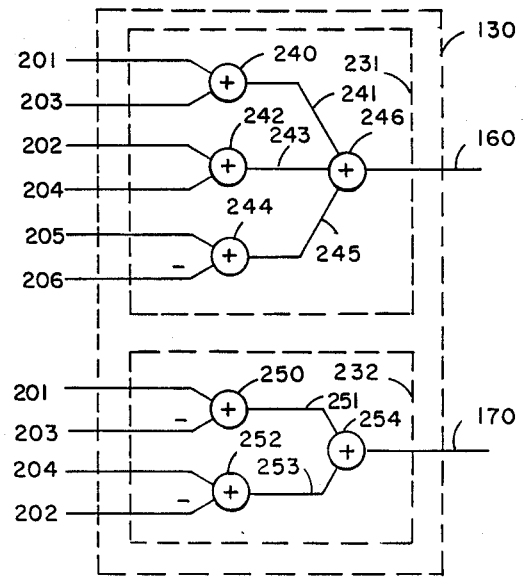
FIG. 3B is a schematic diagram of a circuit used to form an omnidirectional reference signal and a directional signal from the outputs of the antenna array of FIG. 3A.

FIG. 3B is a schematic representation of an embodiment of beamforming device 130 for the augmented Adcock antenna 112 of FIG. 3A. The beamformer 130 consists of a first portion, as generally indicated by 231 and a second portion, as generally indicated by 232. The purpose of the first portion 231 is to generate an output 160 which is substantially omnidirectional as previously discussed. For the augmented Adcock antenna 112 of FIG. 3A, this is achieved by electrically summing the antenna element voltage outputs 201, 202, 203, 204, 205, and 206 in a non-directional manner. Thus, as shown in FIG. 3B, the electrical voltage outputs of the first opposing pair of elements 201 and 203 are input to a voltage adding circuit 240 or adder, and at a second adder 242 the outputs of the second opposing pair of elements 202 and 204 are combined. To remove the strong dipole effect, the difference between the remaining pair of elements 205 and 206 is used. This is accomplished by subjecting the output of one element 206 to a voltage inversion, or as commonly called, a 180° phase shift (as indicated by the minus sign, "−", in the schematic) before being added with the output voltage of the other element 205. Such an adder circuit with one input having a 180° phase shift is commonly called a 180° combiner. When these three resulting voltages 241, 243, 245 are added together by a three-way adder 246, the envelope of the resulting substantially omnidirectional output signal 160 will be mathematically proportional to $$\sum_{i=1}^{N} g_i(t) f(\theta_i) \qquad (1)$$

where N is the total number of received radio signal sources, $g_i(t)$ is the time energy waveform associated with each signal source, and $f(\theta_i)$ is a known function of the relative elevational position, $\theta_i$, of each signal source, which function is also dependent upon the antenna configuration. For the augmented Adcock array of FIG. 3A, it is known that $$f(\theta_i) = 1 + \sin(\theta_i)$$

In a similar fashion, the second beamforming portion 232 is used to provide an output voltage 170 which is substantially directional. In the preferred embodiment, this is provided by summing the difference voltages of the opposing element pairs. As shown in FIG. 3B a difference signal 251 is generated by using a 180° combiner 250 with the output of element 203 fed to the phase-shifted input, and the other element 201 fed to the non-phase shifted input of 180° combiner 250. Similarly, a second difference signal 253 is generated by forming the difference between the other opposing pair of elements 204 and 202. The two difference signals are then summed together 254, thereby providing a directional output signal 170 with envelope $$\sum_{i=1}^{N} g_i(t) \sin \theta_i \, e^{j\phi_i} \qquad (2)$$

in which $\theta_i$ is the elevational position of the i th signal source, $\phi_i$ is the azimuthal position of the i th signal source, and $e^j$ is the complex exponential function.

Other embodiments of an antenna array 112 and beamformer 130 capable of outputting similar omnidirectional and directional signals exist. One such antenna array 112, a quadruple log periodic dipole antenna, is depicted in top elevational view in FIG. 4A and side elevational view in FIG. 4B, with the associated beamformer 130 in FIG. 4C. This antenna 112 has four active elements 301, 302, 303, and 304, wherein each element is disposed from a central support point 320 at substantially right angles from its two adjacent elements. Additionally, each element is of the form of a log periodic dipole, well known in the art. This quadruple log periodic dipole will have greater reception bandwidth than the augmented Adcock of FIG. 3A. A log periodic dipole antenna element such as 301 has a plurality of cross members, as generally indicated by reference characters 307, 308 and 309. In this instance, the cross members are vertically oriented. The spacing between pairs of adjacent vertical members such as 307 and 308 as well as 308 and 309 and the like increases in a substantially logarithmic fashion as the distance from the central support point 320 increases. The relative position of pairs of vertical members which are euidistant from the central support point 320, such as member pairs 306 and 308 will depend upon the wavelength of the center frequency of the radio band of interest. The electrical outputs of the antenna elements 301, 302, 303 and 304 are fed through transmission lines (not shown) to beamforming device 130.

Figure 4A:
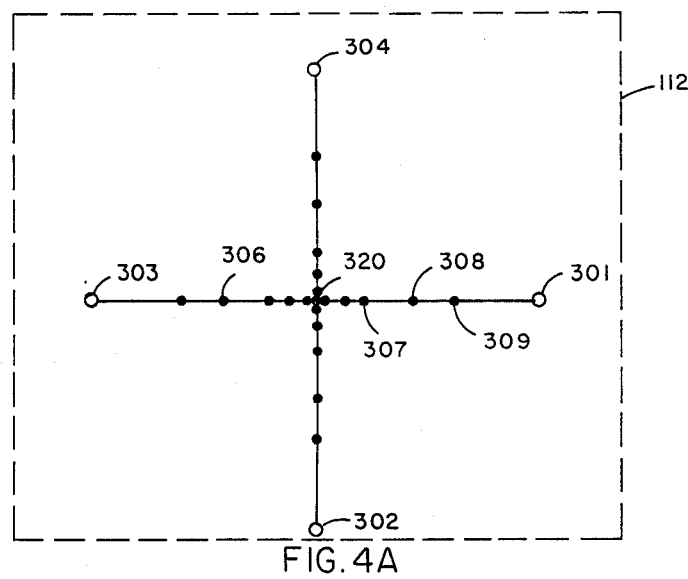
FIG. 4A is a top elevational view of a quadruple log periodic dipole antenna array.
Figure 4B:
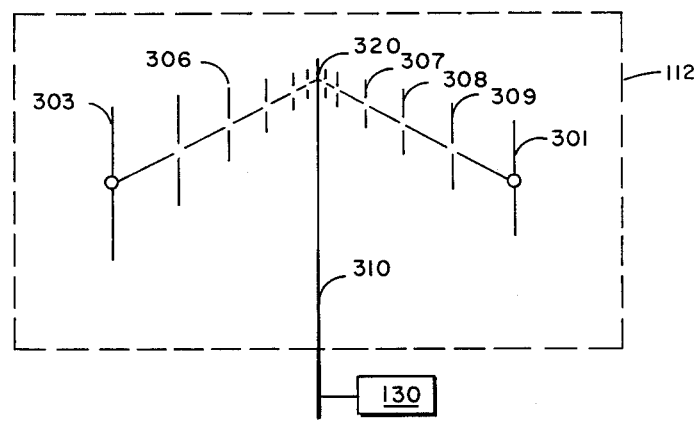
FIG. 4B is a side elevational view of the quadruple log periodic dipole antenna array shown in FIG. 4A.
Figure 4C:
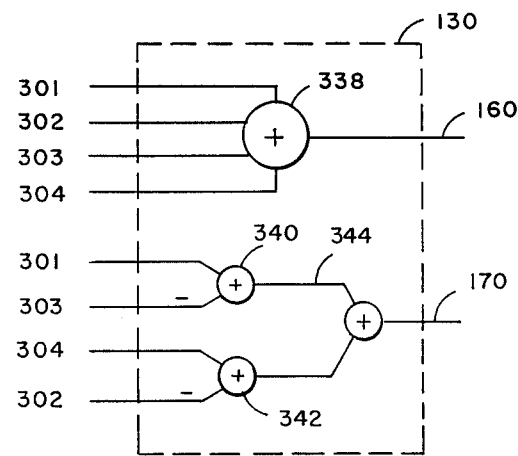
FIG. 4C is a schematic diagram of a circuit used to form an ominidirectional reference signal and a directional signal from the outputs of the antenna array of FIGS. 4A and 4B.

A detailed schematic of a beamforming device 130 associated with the log periodic dipole antenna of FIGS. 4A and 4B is in FIG. 4C. It provides an omnidirectional output 160 and a directional output 170. The omnidirectional output 160 is formed by a quadruple input adder circuit element 338 which provides the sum of the electrical outputs fed from antenna elements 301, 302, 303 and 304. Omnidirectional output 160 will be of the same mathematical form as equation (1) previously described. Directional output 170 is formed by adding the differences between opposing pairs of log periodic dipole antenna element electrical outputs. Referring to FIG. 4C again, this is achieved by 180° combiner 340 having the output of element 301 connected to its non-phase-shifted input, and the output of element 303 connected to its phase-shifted input. In similar fashion, the output of element 302 is subtracted from the output of element 304 by 180° combiner 342. The outputs of 180° combiners 340 and 342 are summed by adder 344 to output the signal at directional output 170. This directional output will be of the same mathematical form as was described in equation (2) above for the augmented Adcock array.

Other, prior art antenna geometries such as the quadruple parabolic reflector described by Rhodes, D. R. in *Introduction to Monopulse* (McGraw Hill Book Company, 1959; York, PA), p 12-15, can be used with appropriate beamforming networks to provide an omnidirectional output and a directional output signal with amplitude dependent on elevational angle and phase dependent on azimuthal angle.

Figure 5:
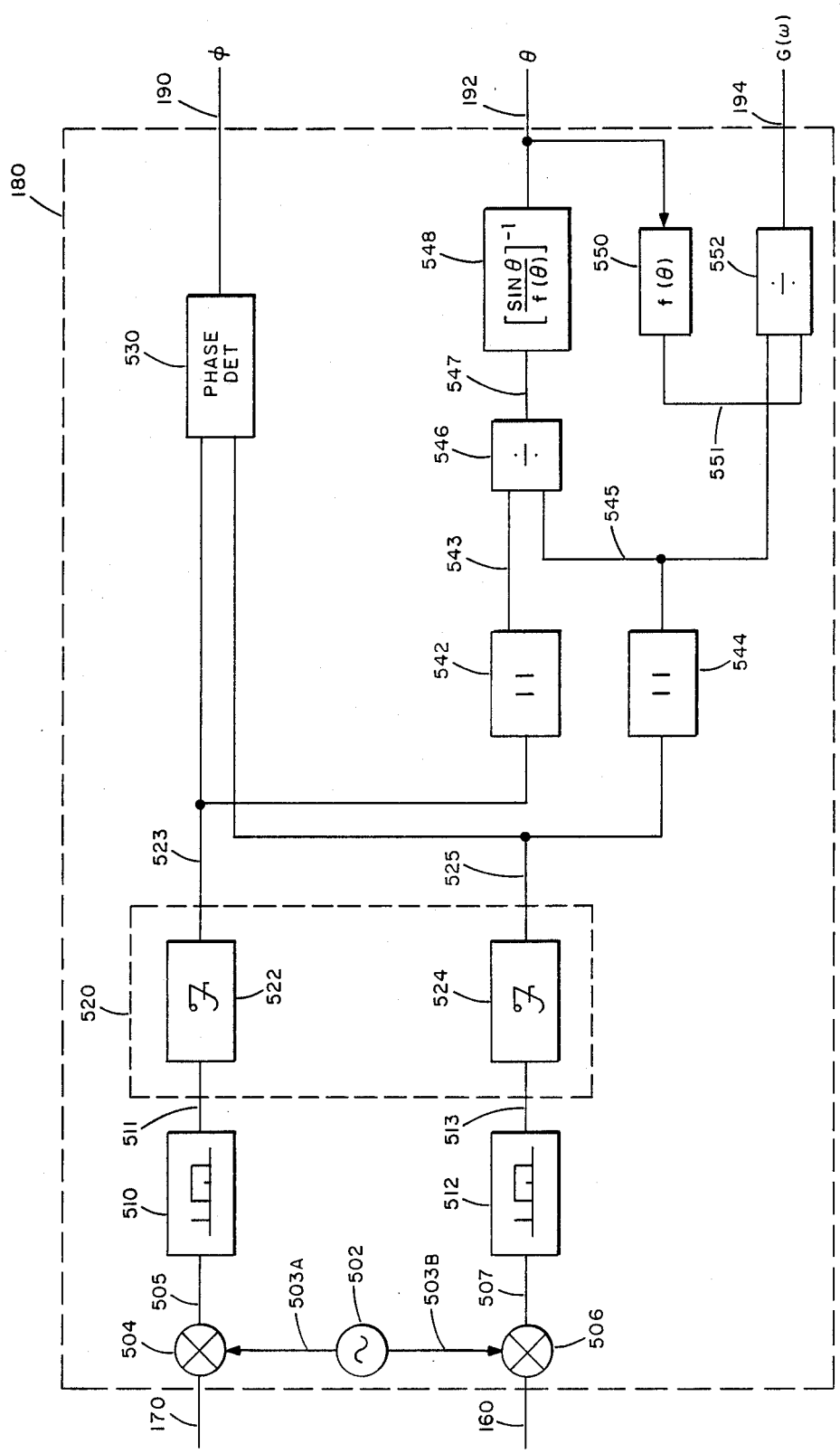
FIG. 5 is a block diagram of a preferred embodiment of the signal processor of the present invention, capable of extracting instantaneous frequency and azimuthal and elevational information.

Turning attention now to FIG. 5, one preferred embodiment of the signal processor 180 of the present invention is shown. Input 170 is the directional signal input. Input 160 is the omnidirectional signal input. First, each input signal is beat to a convenient center frequency for further processing. This is accomplished by sinusoidal signal generator 502 having two outputs, one output 503A being used by mixer 504 to translate directional input 170 and the other signal generator output 503B used by mixer 506 to translate omnidirectional input 160. Output 505 of mixer 504 is then bandlimited by filter 510 to remove the redundant sideband generated by mixer 504. Similarly, output 507 of mixer 506 is bandlimited by filter 512. The bandwidth of filters 510 and 512 would preferably be identical and dependent upon the radio bandwidth of interest. Filter outputs 511 and 513 are then preferably input to a device 520 capable of performing a Fourier transform operation on each of its inputs. Such a device samples its inputs for a period of time and then outputs an estimate of the Fourier transform of its input as a signal having a series of pulses, in which a pulse's position in time, relative to a reference time, indicates its frequency. Device 520 could, for example, be embodied as two one-dimensional devices 522 and 524, each device being a compressive receiver as disclosed in U.S. Pat. No. 4,305,159 to C. Stromswold, et al.

Figure 6:
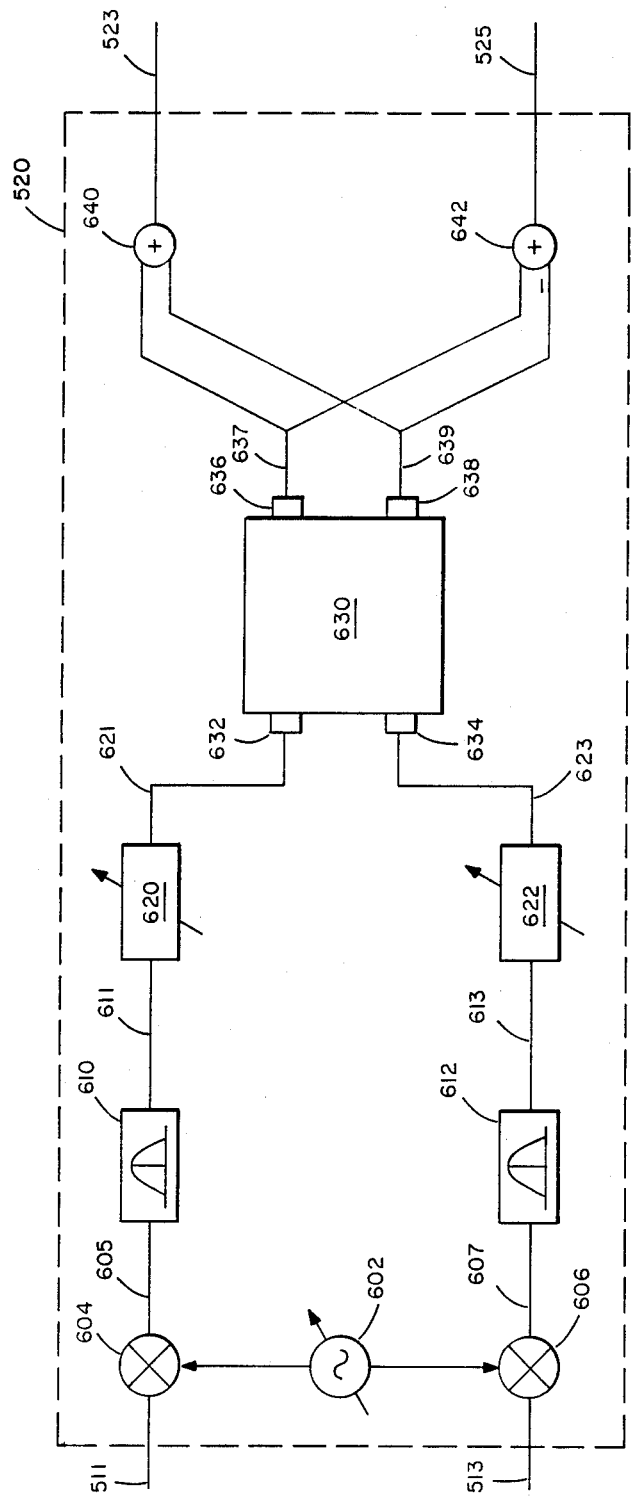
FIG. 6 is a block diagram of a preferred alternative embodiment of the two-dimensional Fourier transform device 520 depicted in FIG. 5.

Alternatively, device 520 is embodied as a two-dimensional compressive receiver and associated circuit elements as depicted in FIG. 6. In particular, bandlimited inputs 511 and 513 are chirped by the use of linearly sweeping oscillator 602 and mixers 604 and 606, respectively. Both mixer outputs 605 and 607 are input to weighting networks 610 and 612, respectively. These weighting networks have, for example, a Gaussian-shaped impulse response to correct for the well-known (sin x)/x sidelobe effect of Fourier transforming a finite length signal. Other appropriate weighting network responses are discussed by Harris, F. in "On the Use of Windows for Harmonic Analysis with the Discrete Fourier Transform", *Proceedings of the IEEE*, Vol. 66, No. 1, Jan. 1978, pp. 51-83. Weighting network outputs 611 and 613 are input to compensating networks 620 and 622. These compensating networks are capable of adjusting the amplitude and phase of signals 611 and 613 to compensate for inexact placement of transducers 632, 634, 636 and 638 associated with dispersive delay line 630. Dispersive delay line 630 is preferably embodied as a layered half space acoustic wave device as taught by Morgan, D. and Ash, E. in "Acoustic-surface-wave Dispersive Delay Line", *IEE Proceedings*, Vol. 116, No. 7, July 1969, pp 1125-1134. Compensated signals 621 and 623 are, in turn, applied to input transducers 632 and 634 of dispersive delay line 630, which convert the electrical signals 621 and 623 to appropriate acoustic form. At the output of acoustic to electrical transducer 636, the electrical signal 637 will be a series of compressed pulses with an envelope of the form $$\sum_{i=1}^{N} G_i(\omega)[\cos\theta_i \, e^{j\phi i} + f(\theta_i)]$$

where $G_i(\omega)$ is the Fourier transform of received energy time waveform $g_i(t)$. Electrical signal 639 at transducer 638 output will have envelope function $$\sum_{i=1}^{N} G_i(\omega) \, j[\cos\theta_i \, e^{j\theta i} - f(\theta_i)]$$

Thus, adder 640 and 180° combiner 642 are necessary to produce the two Fourier transform output signals 523 and 525.

Signals 637 and 639 are input to adder 640, thus producing the Fourier transformed directional signal at adder 640 output 523. Signal 637 is input to the non-phase-shifted input of 180° combiner 642, while signal 639 is input to the phase-shifted input of 180° combiner 642, thus providing the Fourier transformed omnidirectional signal at the output 525 of 180° combiner 642. Returning attention to FIG. 6, then, regardless of the manner of implementation of two dimensional Fourier transform device 520, a Fourier transformed directional signal proportional to $$\sum_{i=1}^{N} G_i(\omega)\cos\theta_i\, e^{j\phi_i}$$

is provided at 523, and a Fourier transformed omnidirectional signal proportional to $$\sum_{i=1}^{N} G_i(\omega) f(\theta_i)$$

is provided at 525.

Returning attention now to FIG. 5, both Fourier transformed signals 523 and 524 are input to a phase detector 530, capable of continuously outputting a signal equal to the phase difference of the two input signals 523 and 525. The detected phase difference is the azimuthal signal 190 and will be of the form of a group of pulses in which a position in time indicates the frequency of a received radio source and the amplitude is proportional to the elevation angle of the received radio source. Fourier transformed directional signal 523 is also input to absolute value circuit 542. In a similar fashion, Fourier transformed omnidirectional signal 525 is input to absolute value circuit 544. The output 543 of absolute value circuit 542 is connected to the numerator input of divider circuit 546. The output 545 of absolute value circuit 544 is fed to the denominator input of divider circuit 546. Divider circuit 546, at its output 547, will continuously provide a signal proportional to the ratio of its two input signals, 543 and 545. Signal 547 will be of the form of a series of pulses in which position in time again indicates radio frequency, and amplitude will be of the form of $$\frac{\sin\theta_i}{f(\theta_i)} \quad (3)$$

where $\theta_i$ is the relative elevational angular position of a radio source, as previously described, and $f(\theta_i)$ is a known function dependent upon the antenna 112, as previously described. Thus, a device 548 capable of continuously producing an output signal 192 which is the inverse of this function, is necessary. For example, device 548 could be embodied as an analog-to-digital converter, which continuously samples signal 547, and continuously applies its digital output bits to the address inputs of a digital lookup table memory, in which the inverse values of equation (3) have been stored. For example, in the case of the augmented Adcock array, $$f(\theta_i) = 1 + \cos\theta_i$$

so that stored in this memory will be the values of $$\frac{\sin\theta_i}{1 + \cos\theta_i}$$

As such, the elevation signal 192 at the output of device 548 will be in the form of a series of pulses, in which position in time indicates frequency and amplitude indicates the relative elevational angle of a radio source. Azimuthal signal 192 is input to device 550. This device provides a signal equal to $$2f(\theta_i)$$

where $f(\theta_i)$ depends upon the antenna 112 used, as previously described. Recalling that signal 545 is proportional to $$\sum_{i=1}^{N} G_i(\omega) f(\theta_i)$$

when it is fed to the numerator input of device 552, and output 551 of device 550 is fed to the denominator input of divider 552, the output 194 of divider 552 will be of the form of a series of pulses in which position in time indicates frequency and amplitude indicates the strength of a radio source.

Some of the many advantages of the present invention should now be readily apparent. For example, a novel receiver system has been disclosed which is capable of continuously providing three output signals, each consisting of a number of pulses, a pulse indicating the presence of a remote radiation source. In each signal, the position in time of a pulse relative to a reference time indicates the radio frequency of the source. In the first signal, the amplitude of a pulse is proportional to the relative elevation angle of the received radiation source. In the second signal, the amplitude of a pulse is proportional to the relative azimuthal angle of the received radiation source. In the third signal, the amplitude of a pulse is proportional to the strength of the received radiation source. The present invention is especially valuable where the Fourier transform device 520 is embodied as a two-dimensional compressive receiver utilizing an ultrasonic dispersive delay line. This embodiment allows precise measurement of the phase difference of the Fourier transform of two input signals without the need for costly temperature controlling or other compensation networks normally required if two separate Fourier transform devices are used. Additionally, it has been shown how the bandwidth limitations of a conventional Adcock array can be overcome by the use of a quadruple log periodic or a quadruple equiangular spiral type antenna. Also those skilled in the art will recognize that if the bandwidth of interest is sufficiently narrow and the position of the strongest transmitter only is desired, the Fourier transform device 520 may be eliminated, assuming bandpass filters 510 and 512 are tuned to the frequency of interest.

Obviously, many modifications and variations of the present invention are possible in the light of the above teachings. It is therefore to be understood that, within the scope of the appended claims, the invention may be practiced otherwise than as specifically described.

I claim:

1. Apparatus for finding the direction of a remote radio transmitter, comprising:
    means for generating an omnidirectional signal;
    means for generating a directional signal in which phase is proportional to the relative azimuthal position of the transmitter, and magnitude is dependent upon the relative elevational position of the transmitter;
    first means for periodically outputting the Fourier transform of its input, connected to receive as input the omnidirectional signal;
    second means for periodically outputting the Fourier transform of its input, connected to receive as input the directional signal;

a phase difference detector connected to detect the phase difference between the output of said first Fourier transform means and the output of said second Fourier transform means thereby providing a periodic signal proportional to the azimuthal position of the remote radio transmitter; and a magnitude difference detector connected to detect the magnitude difference between the output of said first Fourier transform means and the output of said second Fourier transform means thereby providing a signal proportional to the elevational position of the remote radio transmitter;

wherein said first Fourier transform means and said second Fourier transform means together comprises:

a periodic linear chirp signal generator;

a first electronic mixer for combining the omnidirectional signal and the chirp signal to produce a chirped omnidirectional signal;

a second electronic mixer for combining the directional signal and the chirp signal to produce a chirped directional signal;

a beamforming dispersive delay line having a first input transducer connected to receive the chirped omnidirectional signal and second input transducer connected to receive the chirped directional signal, and in which a first output acoustic-to-electrical transducer is positioned to provide a signal indicative of the Fourier transform of the sum of the input signals, and a second output acoustic-to-electrical transducer is positioned to provide a signal indicative of the Fourier transform of the difference of the input signals;

an adder for adding the sum Fourier transform signal and the difference Fourier transform signal; and a subtractor for subtracting the difference Fourier transform signal from the sum Fourier transform signal.

2. Apparatus as recited in claim 1, further comprising:

first adjustable electronic network means for compensating the inexact placement of the first output acoustic-to-electrical transducer, and second adjustable electronic network means for compensating the inexact placement of said second output acoustic-to-electrical transducer.

3. Apparatus for finding the direction of a remote radio transmitter, comprising:

means for generating an omnidirectional signal, said means comprising an antenna;

means for generating a directional signal in which phase is proportional to the relative azimuthal position of the transmitter, and magnitude is dependent upon the relative elevational position of the transmitter;

first means for periodically outputting the Fourier transform of its input, connected to receive as input the omnidirectional signal;

second means for periodically outputting the Fourier transform of its input, connected to receive as input the directional signal;

a phase difference detector connected to detect the phase difference between the output of the first Fourier transform means and the output of the second Fourier transform means thereby providing a periodic signal proportional to the azimuthal position of the remote radio transmitter;

a magnitude difference detector connected to detect the magnitude difference between the output of the first Fourier transform means and the output of the second Fourier transform means thereby providing a signal proportional to the elevational position of the remote radio transmitter; and means for dividing the omnidirectional Fourier transformed signal by a function of the elevation pattern of said antenna, dependent upon the relative elevational position of the transmitter, to continuosuly provide the frequency domain amplitude distribution associated with the transmitter.

4. Apparatus for finding the direction of a remote radio transmitter, comprising:

means for providing a directional signal in which phase is proportional to the relative azimuthal position of the transmitter, and magnitude is dependent upon the relative elevational position of the transmitter, wherein said means for providing a directional signal comprises means for providing a directional signal having magnitude varying as $\cos \theta$ wherein $\theta$ is the relative elevational angle of the transmitter;

means for providing an omnidirectional signal;

means for detecting the phase difference between the directional signal and the omnidirectional signal to provide a signal which is proportional to the relative azimuthal position of the transmitter;

means for determining an algebraic difference in magnitude between the directional signal and the omnidirectional signal to provide a signal proportional to the relative elevational position of the transmitter; and means for determining the frequency content of radiation produced by said transmitter.

5. Apparatus for simultaneously determining the frequency and azimuthal and elevational position of the source of a received radio signal, comprising:

a plurality of antenna elements;

means for combining the electrical output of said antenna elements to provide a reference omnidirectional signal of the form $$\sum_{i=1}^{N} g_i(t) f(\theta_i)$$

wherein N is the total number of received radio signals, $g_i(t)$ is the time variation of energy received from a particular source, and $f(\theta_i)$ is a function of the elevation pattern of the antenna elements and of the azimuthal angle of the received signal;

means for combining the electrical output of said antenna elements to provide a directional signal of the form $$\sum_{i=1}^{N} g_i(t) \sin(\theta_i) e^{j\phi i}$$

wherein N is the total number of received radio signals, $g_i(t)$ is the time variation of energy received from a particular source, and $\sin \theta e^{j\phi}$ is a complex-valued constant in which $\theta_i$ is the relative azimuthal position and $\phi_i$ the relative elevational position of each source;

means for periodically producing an estimate of the Fourier transform of said omnidirectional signal in the form of an electrical signal wherein a pulse is output for each received radio signal and the relative position in time of said pulses denotes frequency of the received radio signal;

means for periodically producing an estimate of the Fourier transform of said directional signal;

means for continuously detecting the phase shift between said Fourier transformed omnidirectional signal and said Fourier transformed directional signal, thereby outputting the elevation angle associated with each received radio signal;

means for continuously detecting the amplitude envelope of said Fourier transformed omnidirectional signal;

means for continuously detecting the amplitude envelope of said Fourier transformed directional signal;

means for continuously providing an electrical ratio signal equal to said detected omnidirectional envelope divided by said detected directional envelope;

means for continuously providing the inverse function of $$\frac{\sin \theta}{f(\theta)}$$

thereby outputting the azimuthal angle associated with each received radio signal; and means for continuously providing an electrical signal equal to said detected omnidirectional signal divided by $f(\theta)$, thereby continuously outputting the amplitude and frequency associated with each received radio signal.

6. Apparatus as recited in claim 5 wherein said means for periodically producing the Fourier transformed omnidirectional signal comprises a compressive receiver.

7. Apparatus as recited in claim 5 wherein said means for periodically producing the Fourier transformed directional signal comprises a compressive receiver.

8. Apparatus as recited in claim 5 wherein said means for periodically producing the Fourier transformed omnidirectional signal comprises:
means for computing the Discrete Fourier Transform algorithm.

9. Apparatus as recited in claim 5 wherein said means for periodically producing the Fourier transformed directional signal comprises:
means for computing the Discrete Fourier Transform algorithm.

10. Apparatus as recited in claim 5 wherein said means for periodically producing the Fourier transformed omnidirectional signal and said means for periodically producing the Fourier transformed directional signal comprises a two dimensional compressive receiver, comprising:
means for generating a periodic linear chirp signal;
first electronic mixer means for combining said omnidirectional signal and said chirp signal;
means for weighting the output of said first electronic mixer means;
second electronic mixer means for combining said directional signal and said chirp signal;
means for weighting the output of said second electronic mixer means;
a beamforming dispersive delay line comprising at least one output acoustic to electrical transducer positioned to provide the Fourier transform of the sum of the input signals, and a second output acoustic to electrical transducer positioned to provide the Fourier transform of the difference of the input signals;
means for adding said first transducer output and said second transducer output, thereby outputting said Fourier transformed directional signal;
means for subtracting said second transducer output from said first transducer output thereby outputting said Fourier transformed omnidirectional signal.

11. Apparatus as recited in claim 10 further comprising:
first adjustable electronic network means for compensating for inexact placement of said first output acoustic to electrical transducer;
second adjustable electronic network means for compensating for inexact placement of said second output acoustic to electrical transducer.

12. Apparatus as recited in claim 5 wherein said plurality of antenna elements are configured as an Adcock antenna.

13. Apparatus as recited in claim 12 wherein said Adcock antenna is augmented by an additional vertically disposed dipole element.

14. Apparatus as recited in claim 5 wherein said plurality of antenna elements are configured as four log periodic dipoles with skewed vertical elements.

15. Apparatus as recited in claim 5 wherein said plurality of antenna elements are configured as a four arm spiral.

16. Apparatus for finding the direction of a radiation source, comprising:
an antenna;
first means, operatively connected to said antenna, for producing an omnidirectional signal;
second means, operatively connected to said antenna, for producing a directional signal whose amplitude is indicative of elevation of the source and whose phase is indicative of the azimuth of the source;
third means, receiving the omnidirectional signal and the directional signal, for periodically producing a first signal indicative of the Fourier transform of the omnidirectional signal, and for periodically producing a second signal indicative of the Fourier transform of the directional signal;
fourth means, receiving the first and second signals, for producing a third signal indicative of phase difference between the first and second signals; and
fifth means, receiving the first and second signals, for producing a fourth signal proportional to the ratio of the respective absolute values of the second and first signals,
wherein the fourth signal is indicative of the elevation of the remote radiation source, and the third signal is indicative of the azimuth of the remote radiation source.

17. Apparatus as recited in claim 16 wherein said third means comprises a compressive receiver.

18. Apparatus as recited in claim 17 wherein said compressive receiver comprises a two-dimensional compressive receiver.

19. Apparatus as recited in claim 16 wherein said third means comprises means for discrete Fourier transformation.

20. Apparatus as recited in claim 16 wherein said fifth means comprises means for indicating frequency content of the omnidirectional and directional signals.

21. Apparatus as recited in claim 16 wherein said antenna comprises a quadruple log periodic array.

22. Apparatus as recited in claim 16 wherein said antenna comprises four log periodic antenna elements disposed in substantially the same horizontal plane and at right angles to their two adjacent elements.

23. Apparatus as recited in claim 16 wherein said antenna comprises an augmented Adcock array.

24. Apparatus as recited in claim 16 wherein said antenna comprises an Adcock antenna augmented by a pair of vertically disposed dipole elements.

25. Apparatus as recited in claim 16, further comprising:
first means, operatively connected to said antenna, for producing an omnidirectional signal;
second means, operatively connected to said antenna, for producing a directional signal whose amplitude is indicative of elevation of the source and whose phase is indicative of the azimuth of the source;
third means, receiving the omnidirectional signal and the directional signal, for periodically producing a first signal indicative of the Fourier transform of the omnidirectional signal, and for periodically producing a second signal indicative of the Fourier transform of the directional signal;
sixth means, receiving the fourth signal, for applying to the fourth signal a transfer function representative of an inverse function of $\sin \theta_i/f(\theta_i)$ where $\theta_i$ is the relative elevational angular position of the radiation source and $f(\theta_i)$ is a function of the elevation pattern of said antenna.

26. Apparatus as recited in claim 16 wherein said third means comprises:
a linearly sweeping oscillator producing a fifth signal;
first chirping means, receiving the fifth signal and the directional signal, for producing a first chirped signal;
second chirping means, receiving the fifth signal and the omnidirectional signal, for producing a second chirped signal;
a first weighting device receiving the first chirped signal and producing a sixth signal;
a second weighting device receiving the second chirped signal and producing a seventh signal;
a dispersive delay line receiving the sixth signal and the seventh signal and producing eighth and ninth signals;
adding means, receiving the eighth and ninth signals, for producing the second signal indicative of a sum of the eighth and ninth signals; and
difference means, receiving the eighth and ninth signals, for producing the first signal indicative of a difference between the eighth and ninth signals.

27. Apparatus as recited in claim 16 wherein said antenna comprises an antenna having an antenna range covering substantially 360 degrees of azimuth and substantially at least 180 degrees of elevation.

28. Apparatus for determining the direction of a radiation source, comprising:
an antenna;
first means, operatively connected to said antenna, for producing first and second signals whose difference in phase is indicative of azimuth of the source and whose difference in amplitude is indicative of elevation of the source; and
second means, receiving the first and second signals, for comparing the magnitude and phase of the first and second signals to produce third, fourth and fifth signals respectively indicative of elevation, azimuth and radiation frequency domain amplitude distribution of the source.

29. Apparatus as recited in claim 28 wherein said first means comprises:
means for producing an omnidirectional signal as the first signal; and
means for producing a directional signal as the second signal.

30. Apparatus as recited in claim 29 wherein said means for producing a directional signal comprises means for producing a directional signal having magnitude varying as $\cos \theta$ wherein $\theta$ is the relative elevational angle of the radiation source.

31. Apparatus as recited in claim 28 wherein said second means comprises a compressive receiver.

32. Apparatus as recited in claim 31 which said compressive receiver comprises a two-dimensional compressive receiver.

33. Apparatus as recited in claim 28 wherein said second means comprises means for discrete Fourier transformation.

34. Apparatus as recited in claim 28 wherein said second means comprises means for indicating frequency content of the first and second signals.

35. Apparatus as recited in claim 28 wherein said antenna comprises four log periodic antenna elements disposed in substantially the same horizontal plane and at right angles to their two adjacent elements.

36. Apparatus as recited in claim 28 wherein said antenna comprises a quadruple log periodic array.

37. Apparatus as recited in claim 28 wherein said antenna comprises an augmented Adcock array.

38. Apparatus as recited in claim 28 wherein said antenna comprises an Adcock antenna augmented by a pair of vertically disposed dipole elements.

39. Apparatus as recited in claim 28 wherein said second means comprises:
third means, receiving the first signal and the second signal, for periodically producing a sixth signal indicative of the Fourier transform of the first signal, and for periodically producing a seventh signal indicative of the Fourier transform of the second signal;
fourth means, receiving the sixth and seventh signals, for producing the fourth signal indicative of phase difference between the sixth and seventh signals;
fifth means, receiving the sixth and seventh signals, for producing the third signal proportional to the ratio of the respective absolute values of the seventh and sixth signals; and
sixth means, receiving the third signal, for applying to the third signal a transfer function representative of an inverse function of $\sin \theta_i/f(\theta_i)$ where $\theta_i$ is the relative elevational angular position of the radiation source and $f(\theta_i)$ is a function of the elevation pattern of said antenna.

40. Apparatus as recited in claim 28 wherein said second means comprises:
a linearly sweeping oscillator producing a sixth signal;
first chirping means, receiving the sixth signal and the first signal, for producing a first chirped signal;
second chirping means, receiving the sixth signal and the second signal, for producing a second chirped signal;
a first weighting device receiving the first chirped signal and producing a seventh signal;

a second weighting device receiving the second chirped signal and producing an eighth signal;

a dispersive delay line receiving the seventh signal and the eighth signal and producing ninth and tenth signals;

adding means, receiving the ninth and tenth signals, for producing an eleventh signal indicative of a sum of the ninth and tenth signals, and indicative of the Fourier transform of the first signal; and difference means, receiving the ninth and tenth signals, for producing a twelfth signal indicative of a difference between the ninth and tenth signals, and indicative of the Fourier transform of the second signal.

41. Apparatus as recited in claim 28 wherein said antenna comprises an antenna having an antenna range including substantially 360 degrees of azimuth and substantially at least 180 degrees of elevation.

42. Apparatus for finding the direction of a remote radio transmitter, comprising:

means for providing a directional signal in which phase is proportional to a first relative angular position of the transmitter, and magnitude is dependent upon a second relative angular position of the transmitter;

means for providing an omnidirectional signal;

means for detecting the phase difference between the directional signal and the omnidirectional signal to provide a signal which is proportional to the first relative angular position of the transmitter;

means for determining an algebraic difference in magnitude between the directional signal and the omnidirectional signal to provide a signal proportion to the second relative angular position of the transmitter; and means for determining the frequency content of radiation produced by said transmitter, wherein said means for determining the frequency content comprises a compressive receiver.

43. Apparatus as recited in claim 42 wherein said compressive receiver comprises a two-dimensional compressive receiver.

44. Apparatus as recited in claim 42 wherein said means for providing a directional signal comprises means for providing a directional signal having magnitude varying as cos $\theta$ wherein $\theta$ is the relative elevational angle of the transmitter.

45. Apparatus as recited in claim 42 wherein:

the first relative angular position of the transmitter comprises the relative azimuthal position of the transmitter; and the second relative angular position of the transmitter comprises the relative elevational position of the transmitter.

46. Apparatus for finding the direction of a remote radio transmitter, comprising:

means for providing a directional signal in which phase is proportional to a first relative angular position of the transmitter, and magnitude is dependent upon a second relative angular position of the transmitter;

means for providing an omnidirectional signal;

means for detecting the phase difference between the directional signal and the omnidirectional signal to provide a signal which is proportional to the first relative angular position of the transmitter;

means for determining an algebraic difference in magnitude between the directional signal and the omnidirectional signal to provide a signal proportional to the second relative angular position of the transmitter; and means for determining the frequency content of radiation produced by said transmitter, wherein said means for determining the frequency content comprises means for discrete Fourier transformation.

47. Apparatus for finding the relative direction of remote radiation sources, comprising:

an Adcock antenna augmented by a pair of vertically disposed dipole elements;

means for processing the signal received at said antenna to provide a directional signal containing both azimuthal and elevation information of a radiation source;

means for processing the signal received at said antenna to provide an omnidirectional signal;

means for detecting the phase difference between the directional signal and the omnidirectional signal to provide a signal which is proportional to the azimuthal angle of a radiation source with respect to said antenna; and means for determining the algebraic difference in amplitude between the directional and omnidirectional signals to provide a signal proportional to the elevation angle of the radiation source with respect to said antenna.

48. Apparatus for finding the relative direction of remote radiation sources, comprising:

four log periodic antenna elements disposed in substantially the same horizontal plane and at right angles to their two adjacent elements;

means for processing the signal received at said antenna to provide a directional signal containing both azimuthal and elevation information of a radiation source;

means for processing the signal received at said antenna to provide an omnidirectional signal;

means for detecting the phase difference between the directional signal and the omnidirectional signal to provide a signal which is proportional to the azimuthal angle of a radiation source with respect to said antenna; and means for determining the algebraic difference in amplitude between the directional and omnidirectional signals to provide a signal proportional to the elevation angle of the radiation source with respect to said antenna.

49. Apparatus as recited in claim 4 wherein said means for providing a directional signal comprises an Adcock antenna augmented by a pair of vertically disposed dipole elements.

50. Apparatus as recited in claim 4 wherein said means for providing a directional signal comprises four log periodic antenna elements disposed in substantially the same horizontal plane and at right angles to their two adjacent elements.

51. Apparatus as recited in claim 42 wherein said means for providing a directional signal comprises an Adcock antenna augmented by a pair of vertically disposed dipole elements.

52. Apparatus as recited in claim 42 wherein said means for providing a directional signal comprises four log periodic antenna elements disposed in substantially the same horizontal plane and at right angles to their two adjacent elements.

53. Apparatus as recited in claim 46 wherein said means for providing a directional signal comprises an Adcock antenna augmented by a pair of vertically disposed dipole elements.

54. Apparatus as recited in claim 46 wherein said means for providing a directional signal comprises four log periodic antenna elements disposed in substantially the same horizontal plane and at right angles to their two adjacent elements.

55. Apparatus as recited in claim 46 wherein:
the first relative angular position of the transmitter comprises the relative azimuthal position of the transmitter; and
the second relative angular position of the transmitter comprises the relative elevational position of the transmitter.

* * * * *